United States Patent [19]

Levine

[11] Patent Number: 4,853,064

[45] Date of Patent: Aug. 1, 1989

[54] METHOD OF FORMING A STRUCTURAL BOND EMPLOYING INDIRECT EXPOSURE OF A LIGHT RESPONSIVE ADHESIVE

[75] Inventor: Aaron W. Levine, Mercer County, N.J.

[73] Assignee: General Electric Company, Schenectady, N.Y.

[21] Appl. No.: 69,068

[22] Filed: Jul. 2, 1987

[51] Int. Cl.⁴ .............................................. B32B 31/20
[52] U.S. Cl. ............................ 156/275.5; 156/275.7; 156/291
[58] Field of Search .................. 156/158, 272.2, 272.8, 156/275.1, 275.3, 273.3, 275.5, 275.7, 291, 308.2, 308.4; 250/492.1, 492.2, 492.3, 503.1, 504 R, 396 R

[56] References Cited

U.S. PATENT DOCUMENTS

| | | | |
|---|---|---|---|
| 3,137,633 | 6/1964 | Kline | 156/275.5 |
| 3,217,088 | 11/1965 | Steierman | 174/52 |
| 3,301,648 | 1/1967 | Sheldon | 156/296 |
| 3,393,819 | 7/1968 | Walle | 156/275.5 |
| 4,116,655 | 9/1978 | Lewis | 156/296 |
| 4,196,032 | 4/1980 | Eggleston | 156/296 |
| 4,208,005 | 6/1980 | Nate | 156/225.5 |
| 4,222,635 | 9/1980 | Jülke | 156/275.5 |
| 4,356,050 | 10/1982 | Crivello et al. | 156/273.3 |
| 4,388,128 | 6/1983 | Ogawa | 156/275.5 |
| 4,418,284 | 11/1983 | Ogawa | 156/275.5 |
| 4,425,375 | 1/1984 | Abramson | 156/275.5 |
| 4,470,858 | 9/1984 | McMaster | 156/275.5 |
| 4,510,005 | 4/1985 | Nijman | 156/294 |
| 4,753,704 | 6/1988 | Stewart | 156/275.5 |

*Primary Examiner*—Merrell C. Cashion, Jr.
*Attorney, Agent, or Firm*—William Squire; James C. Davis, Jr.; Paul R. Webb, II

[57] ABSTRACT

A plurality of CCD imaging devices are bonded aligned to a color separating prism using glass rods bonded to prism support plates, the CCD devices being bonded to the rods. The rods and devices are aligned in a complex fixture which generally inhibits direct exposure to light of the adhesive at the different joints. A light responsive adhesive having a long pot life and short cure time is cured by exposing the ends of the glass rods to a light flash. The adhesive along the side walls of the rods cures in response to the indirect exposure of scattered light transmitted through the rod side walls.

11 Claims, 2 Drawing Sheets

METHOD OF FORMING A STRUCTURAL BOND EMPLOYING INDIRECT EXPOSURE OF A LIGHT RESPONSIVE ADHESIVE

This invention relates to a method, employing responsive adhesives, for adhesively attaching a first member to a second member.

In the manufacture of solid state cameras, a critical structure in the assembly includes the imaging device. This imaging device includes a glass prism which divides incident light into three color light bands. The position of each prism output port for the different color light bands is critical in the prism, and therefore the prism is extremely expensive to fabricate. Each output port has a given axis to which a solid state light responsive element must be aligned. For example, the solid state element may comprise a charge coupled device (CCD) which must be aligned relative to the optical axis of a particular color band in six degrees of freedom, three translational axes and three axes of rotation. The alignment of each imaging element to the other two and to the corresponding prism output port is critical. The positioning of each imaging element respective to its corresponding prism output port has a tolerance of microns.

A technique has been developed for attaching the imaging elements in spaced relation to the corresponding prism output port while maintaining the desired critical alignment. That technique adhesively bonds each imaging element to a supporting structure adjacent to the corresponding prism output port. Several significant problems are presented by adhesively bonding the imaging element to the prism support structure.

The first problem is that the alignment of each imaging element relative to the prism output port requires costly fixturing structures which must precisely maintain the alignment of each CCD element to the prism during curing of the adhesive. One such fixture has a manufacturing cost of hundreds of thousands of dollars. Coupled with this costliness of the fixturing for assembling one imaging device is the fact that most adhesives have certain characteristics which make bonding of the imaging elements relatively slow. For example, it is known that adhesives have a pot life, (i.e., the time available in which the adhesive mixture has a relatively low viscosity sufficient for the adhesive to be worked), that is a fraction of the cure time. The cure time for a given adhesive is usually proportional to its pot life; the longer the pot life, the longer the cure time.

In adhering the different elements of an imaging device of the type described above, employing fixturing necessary to hold the different parts of the structure in proper position, a useful pot life is about three-quarters of an hour. The problem with using adhesives having such a pot life, however, is that their corresponding cure time is approximately 24 hours. Thus, the different structures of the imaging device are required to remain in the fixture for a 24 hour period. It is readily apparent that the use of such a costly fixture to assemble one imaging device in a 24 hour period is inefficient.

The present inventor recognizes that what is needed is an adhesive which has a relatively long pot life and a relatively short cure time. A class of adhesives which meets this requirement are those that are light responsive and, more particularly, are responsive to ultraviolet (UV) light. Normally, in the implementation of light responsive adhesives, the adhesive cures in a matter of one to three minutes when exposed to high intensity incident light.

A further problem arises in the use of light curing adhesives in the implementation of adhesively bonding the different structural elements of an imaging device assembly. This problem arises in the sense that the prism is secured between two opaque metal plates. Further, glass rods are used to support the imaging solid state elements in a region between the two plates. The opaque CCD elements need to be secured to the side walls of the glass rods. The glass rods and metal plates and the prism all have coefficients of thermal expansion (CTE) that are closely matched, to preclude distortion during exposure of the imaging device assembly to temperature excursions.

The costly fixturing system noted above for aligning the different imaging elements relative to the prism is relatively complex, large and tends to occupy a large portion of the region adjacent to the imaging elements as will be explained in the specification herein. These fixturing structures are opaque. Further, the prism and internal regions of the imaging device assembly are nonreflective black, to preclude spurious optical reflections which may interfere with the operation of the prism. Therefore, the interior region of the prism and device assembly are made nonreflective, which is the antithesis of the requirements of curing the light sensitive adhesive.

The adhesive is required in regions which in some cases face the interior volume of the imaging device assembly and therefore is not easily exposable to a light source. Further, the alignment fixture limits the location where the light source can be aimed at the device assembly for curing the adhesive.

The present inventor recognizes an important unexpected property of light transmitting glass rods in connection with curing light sensitive adhesives. He recognizes that indirect exposure of the light sensitive adhesives by the relatively low scattering, i.e., low transmission intensity, of light transversely through the side walls of a glass rod which is longitudinally transmitting light axially through the rod provides sufficient illumination to the regions adjacent the rod side walls to cure light sensitive adhesive located in those adjacent regions.

According to the present invention, a method of adheringly attaching a glass structure to a member is provided. The structure tends to transmit light in one direction and exhibit relatively low intensity scattering of light transverse that one direction in response to light incident thereon at an end thereof parallel to its length dimension in that one direction. The method comprises applying an adhesive to a wall of one of the glass structure and member. The adhesive is of the type which tends to cure in response to incident light. A member is positioned in contact with the glass structure at a side wall thereof at the adhesive. One end of the glass structure is illuminated in the one direction parallel to the wall in which direction the structure tends to transmit that light to its other end for a time sufficient for the relatively-low-intensity transverse-scattered light passing through the side wall to which the adhesive is applied to cure the adhesive.

Figure 1:
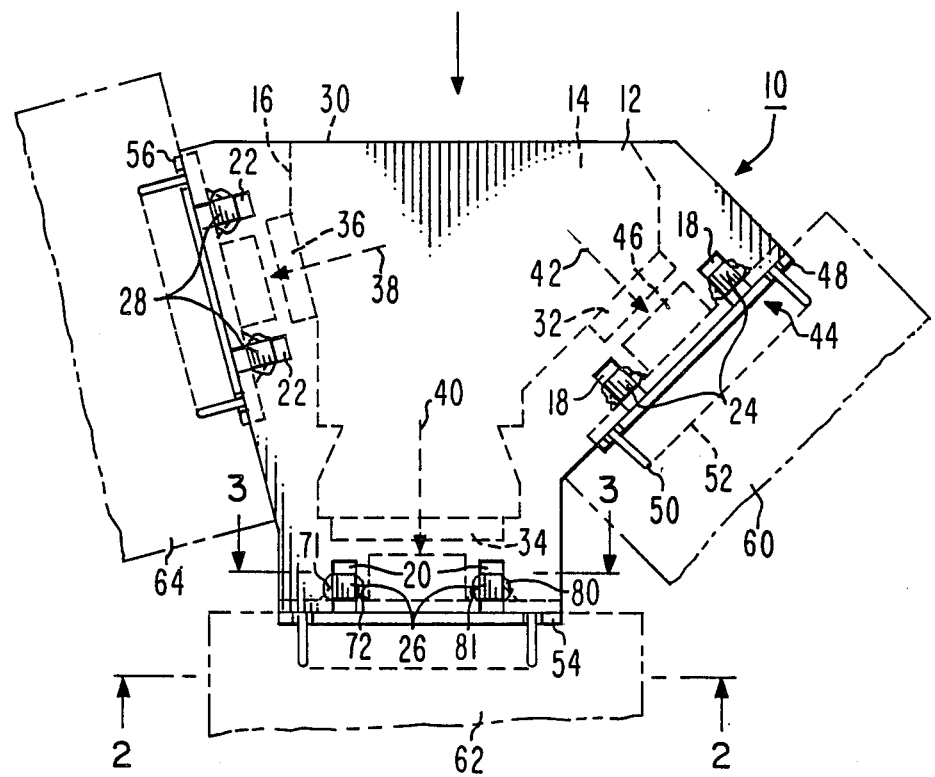
FIG. 1 is a plan view of a solid state imaging device assembly and corresponding fixturing according to one embodiment of the present invention.
Figure 2:
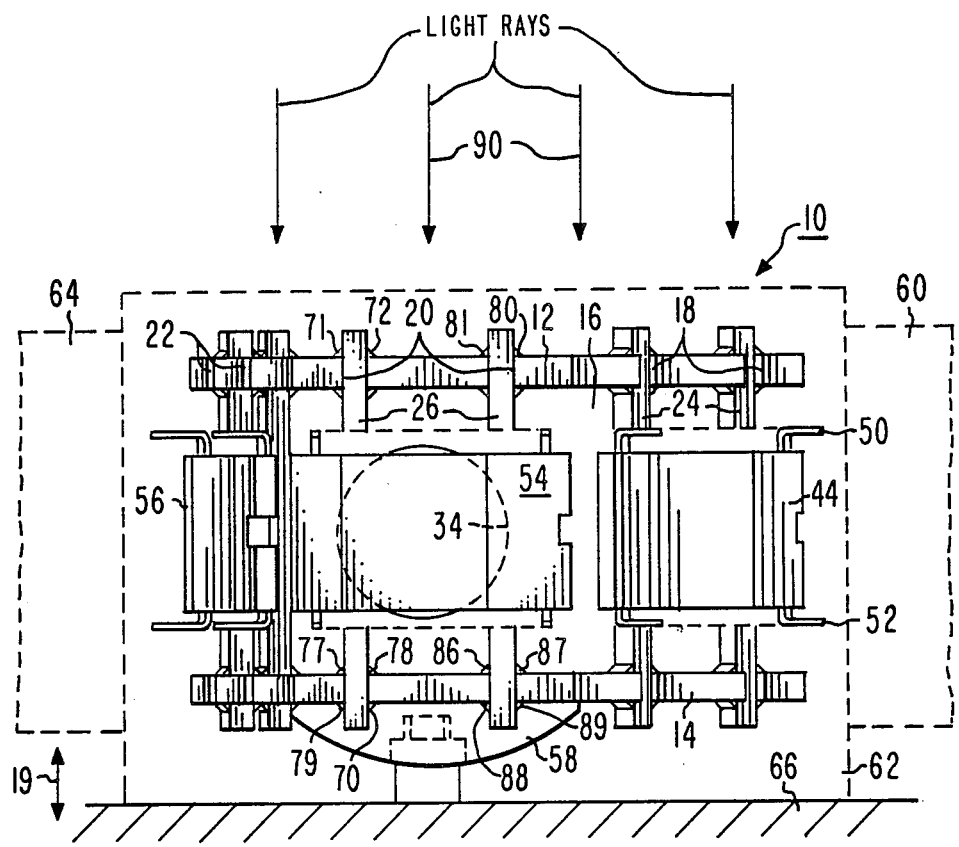
FIG. 2 is a front end elevation view of the embodiment of FIG. 1 taken along lines 2—2.

In FIGS. 1 and 2, an imaging device assembly 10 comprises a pair of upper and lower metal opaque plates 12 and 14 of similar shape and a glass prism 16. Plates 12 and 14 are made of the same metal, for example, a metal available under the trademark Kovar having a coefficient of thermal expansion (CTE) which closely matches that of the glass from which the prism 16 is constructed. Prism 16 is bonded to the facing inner surfaces of plates 12 and 14. In FIG. 1, plate 12 includes three sets 18, 20 and 22 of notches. Plate 14 includes identical notches aligned in directions 19 (FIG. 2) with the three sets 18, 20 and 22 in plate 12.

A pair of elongated square section glass rods 24 are in notch set 18. The length dimensions of the rods are perpendicular to the plane of plates 12 and 14. A second pair of rods 26 of like dimension as rods 24 are in the notch set 20. A third set of rods 28 are in notch set 22. The rods 24, 26 and 28 are parallel and are all glued to the plates 12 and 14 by an ultraviolet-light-responsive adhesive which cures in a matter of a few minutes when exposed to ultraviolet light. The adhesive has an indefinite pot time until exposed to the ultraviolet light.

In FIG. 1, prism 16 has an inlet aperture 30 and three outlet apertures 32, 34 and 36. Aperture 36 transmits light in the red bandwidth, as exemplified by arrow 38. Aperture 34 transmits light in the green bandwidth, as exemplified by arrow 40. Aperture 32 transits only blue light, as indicated by arrow 42. The prism 16 is of precise dimensions to provide the proper colors of light through each of the apertures 32, 34 and 36. Each of the exit apertures 32, 34 and 36 transmit an optical image received by aperture 30 in a light bandwidth of its given color.

A solid state CCD imaging device 44 is bonded to rods 24 in the path of the transmitted image from aperture 32. Device 44 includes an image pickup 46 secured to a substrate 48 and coupled electrically to two parallel arrays of leads 50 and 52. Secured in the path of the image transmitted from aperture 34 is a second CCD imaging pickup image device 54. Device 54 is similarly constructed as device 44. A third CCD imaging device 56 is secured in the path of the image transmitted by aperture 36. The device 54 is bonded to glass rods 26 and the device 56 is bonded to glass rods 28. The alignment of each of the imaging devices 44, 54 and 56 relative to the prism 16 output apertures 32, 34 and 36 is critical. Each imaging device 44, 54 and 56 needs be aligned relative to that optical axis in three translational axes and three rotational axes, to tolerances within micrometers. The solid state imaging devices 44, 54 and 56 are bonded to the respective glass rods by ultraviolet light sensitive adhesive identical to the adhesive used to bond the rods to the plates 12 and 14.

As described below, the bonds to each rod are cured simultaneously, one rod at a time. In the alternative, the bonds to several or to all rods may be cured simultaneously. However, these alternatives are more costly because they require a collimnated UV light source of relatively large size, which is relatively costly.

The interior region of the assembly described so far (comprising the facing surfaces of plates 12 and 14 and the exterior surfaces of prism 16 and the interior facing surfaces of the imaging devices 44, 54 and 56) is entirely nonreflective black, to minimize spurious light signals impinging the imaging devices. FIG. 2 shows an imaging device assembly 58 bonded to the undersurface of plate 14. Support 58 is convex in shape and is threaded for securing the imaging device assembly to support structure. The bonding of the support 58 to plate 14 and of plates 12 and 14 to prism 16 is made with less costly fixturing and non-light responsive adhesive before the bonding of devices 44, 54 and 56.

The problem with assembling the CCD devices 44, 54 and 56 of imaging device assembly 10 is that the locations of the various joints between the different structures to be bonded are not readily aligned with a given light path.

In FIGS. 1 and 2, the regions 60, 62 and 64, shown in phantom, represent a fixturing apparatus employed to hold the different imaging devices 44, 54 and 56 in the desired alignment relative to the prism 16 and for coupling the leads of the imaging devices to a display which monitors the orientation of the prism. The imaging devices are aligned relative to the prism by observing the images as produced by an electronic raster scan display produced by the system. The images shown by the display are visually observed as the CCD devices are moved about to align them to the prism.

Because of the criticality of the alignment, the fixturing is relatively large, costly and is constructed with precision to provide the necessary alignment of the different imaging devices to the optical axes of the prism exit apertures to achieve the desired image on the display monitors (not shown). This fixturing necessitates the use of clamps and wiring harnesses which occupy much of the surrounding space of assembly 10. The imaging device assembly 10 is secured to a support table 66 via support 58.

Figure 3:
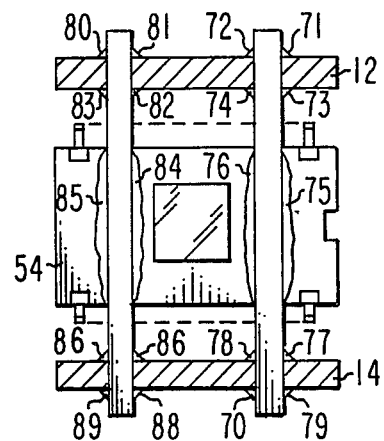
FIG. 3 is a sectional elevation view of the embodiment of FIG. 1 taken along lines 3—3.

In FIG. 3, representative bond joints which are required to be cured by incident ultraviolet light are illustrated. One rod 20 has bond joints 70-79. Joints 71-74 bond that one rod 20 to plate 12 and joints 70, 77-79 bond that rod to plate 14. Joints 75 and 76 bond that one rod 20 to the imaging device 54 substrate. Joints 80-89 similarly bond the other one of rods 20 to plates 12 and 14 and to device 54.

The joints 75, 76 and 84, 85 are at the interfaces of the imaging device 54 and the corresponding rods 20. These joints face interior toward the prism 16 (FIG. 1). The joints between the plates and the rods, except for the upper joints 71, 72, 80 and 81, are significantly blocked by the fixturing represented by fixtures 60, 62 and 64 (FIG. 1), and by the support table 66 (FIG. 2). Each of the remaining imaging devices 44 and 56 is bonded with similar joints to the respective rods 24 and 22. Those rods are bonded to the respective plates 12 and 14 in similar locations. The rods also are adjustably located within the notches 18, 20 and 22 during the bonding process by the fixturing.

It is estimated that about 45 minutes is required to align the various imaging devices to the prism 16 output apertures, accordingly requiring a relatively long pot time for the adhesive. Thermally reactive adhesives with sufficiently long pot lives typically require a 24 hour curing time. This time would be prohibitive in the instant embodiment because the fixturing apparatus would be occupied for an excessively long time. Therefore, it is more advantageous to use a long pot time and short cure time adhesive for the purpose of bonding the various structures together. However, a problem is readily observed in the use of light responsive adhesive in the described assembly.

The problem is that generally glass is known to transmit light in one direction and that negligible light is scattered transverse that direction through the side walls of the glass. That is, there is relatively little light scattering in the direction transverse the direction in which light is transmitted through the glass. Therefore, the problem presented in curing the various adhesive joints in the present assembly is one of being able to direct adhesive exposure light rays to all of the adhesive joints in a reliable manner. If any one joint is not adequately exposed, that joint will not cure. The adhesive at that joint will remain viscous, which is undesirable due to the criticality of the alignment requirement of the different structures. Therefore, a need is recognized for reliably curing all of the joints.

It was discovered by the present inventor that a single exposure of light by rays 90 on the facing end of any one of the glass rods 24, 26 and 28 simultaneously cures the joints corresponding to that rod. While the bond joints facing the rays 90 are immediately exposed to the light rays, it was not apparent that the remaining joints are uniformly adequately exposed to the light rays 90. Resulting exposure of the light rays 90, as shown in FIG. 2, to the end surfaces of the rods 24, 26 and 28 surprisingly resulted in the curing of all of the bond joints throughout the structure. It is plain that the joints distal the rays 90, for example, joints 77-79, 70, and 86-89, are not directly exposed to the rays 90 but yet cure to the same extent as all other joints.

It is believed that this curing occurs due to exposure of the various internal and distal joints to the light rays 90 in response to the transverse scattered light transmitted through the side walls of the various rods. While the light rays scattered in the transverse direction through the rod side walls are low in intensity, the exposure was found to be sufficient to cure all of the joints corresponding to that rod. Exposure of the light rays is momentary and, by way of example, is emitted by a pulsed xenon lamp for approximately 60 seconds directed on the end of each rod.

In FIG. 2, the rays 90 are by way of illustration shown incident over the entire assembly 10. In practice, because large flash sources are costly and tend to be impractical, a relatively small UV source can be used, e.g., 3/16 diameter. In this case, the source is coupled to a glass rod (not shown). The end of this glass rod is axially aligned one at a time with an end of each of rods 24, 26 and 28; and the UV source is flashed.

The exposure time, while short, is of a time interval to fully expose the various adhesive joints to an amount of light sufficient to achieve cure for mechanical integrity. This curing of the various joints is surprising in that such light rods are not generally known for the transverse scattering of light incident on their axial ends being sufficient for curing light responsive adhesive. It is believed that while a large proportion of the light is not scattered in the transverse directions, a small amount of light that is transversely scattered through the rod side walls is sufficient to achieve curing of light sensitive adhesive. By way of example, one such adhesive is Dymax, which is commercially available. This adhesive is exposed to a flash of light. The light used to create the exposure can be, for example, a xeon flash lamp, flashed for one minute of exposure. The resulting cure takes several minutes. The composition of the Dymax glue is not known, as this is proprietary to the manufacturer. The Dymax glue is available from the American Chemical and Engineering Company having a catalog reference designation Light-weld 601.

Because the resulting imaging device assembly structure is required to withstand vibration and environmental shock to an extent greater than that possible provided by the light sensitive adhesive, additional adhesive can be applied later in the process after subsequent curing of the light sensitive adhesive. The additional adhesive is applied to the different bond joints to provide structural strength to the different joints. The provision of additional structural adhesive to the joints after curing is acceptable because the entire assembly within a matter of minutes after exposure to light may be removed from the relatively costly fixturing structure and bonded with the added adhesive elsewhere. Once the light-sensitive adhesive cures, then the relatively critical alignment of the different elements of the imaging device assembly remains fixed in place and fixturing is no longer required.

While the application of the bonding of the different structural elements is described herein relative to an imaging device assembly, it is apparent that the methodology of the present invention may be applied to other structures. Such structures include light-curing adhesive joints bonding a glass rod or other glass structure, for example sheet glass, at the light-scattering sides of the glass structure to other structures. The glass is exposed to an adhesive curing illumination at an axial light-transmissive face thereof for a time period sufficient that the transverse scattered light exiting the glass through the walls transverse the axial direction is of sufficient duration to cure the light sensitive adhesive. Glass sheets and rectangular glass structures as well as circular cylindrical rods may be used. The surprising effect is that the relatively very low intensities of the transverse scattered light transmitted through the glass normal to the axial transmission direction cures light-sensitive adhesives, which has not previously been thought possible.

What is claimed is:

1. A method of adheringly attaching a glass structure having at least one side wall to a member having at least one wall, said structure characterized in that, in response to light incident on an end thereof, the structure transmits light in a length direction and exhibits scattering of light transverse that length direction through said at least one side wall, said scattered light having an intensity lower than the intensity of said incident light, said method comprising:
   applying adhesive to a wall of at least one of said glass structure and member, said adhesive being of the type which cures upon exposure to said transverse scattered light incident thereon;
   positioning a wall of said member in contact with said glass structure at a side wall thereof parallel to said length dimension and in contact with said adhesive; and
   illuminating one end of the glass structure in a direction parallel to said length direction for a time sufficient for said low intensity transverse scattered light passing through said at least one side wall to which the adhesive is applied to cure said adhesive.

2. The method of claim 1 further including a plurality of said structures wherein said adhesive applying step includes applying said adhesive to a respective side wall of each of said structures, said positioning step positioning said member in contact with each said respective side walls of said plurality of structures and the applied adhesive, and said illuminating step includes illuminating the ends of said structures.

3. The method of claim 2 wherein said structures are parallel and said illuminating step includes illuminating said structures with a single light source.

4. The method of claim 1 wherein said adhesive applying step includes applying said adhesive to said at least one wall of said structure at a plurality of locations thereon along the structure length, said positioning said step positioning at least one member in contact with the adhesive at said plurality of locations.

5. The method of claim 1 wherein said glass structure is an elongated rod.

6. The method of claim 5 wherein the rod is square in section.

7. A method of adhesively attaching an elongated glass rod to a member, said rod characterized in that, in response to light incident on an end thereof, the structure efficiently transmits light along its length and inefficiently scatters light transverse its length, said method comprising:
applying adhesive to a side wall of at least one of said rod and member at a plurality of spaced locations intermediate the ends of said at least one rod and member, said adhesive curing upon exposure to said transversely scattered light;
positioning at least one member in contact with said adhesive at said spaced locations at a side wall of said at least one rod; and
illuminating one end of said at least one rod such that said at least one rod transmits the incident light to the other end for a time sufficient for said transverse light transmission to cure said adhesive at said side wall.

8. The method of claim 7 wherein said positioning step includes holding said at least one member in place during said illuminating step and after said adhesive cures, applying a secondary non-light responsive adhesive to said at least one rod and at least one member for strengthening the bonds of the at least one member to said at least one rod.

9. A method of assembling an imaging device for a camera, said device comprising a prism for separating incident light into a plurality of color lights at corresponding spaced locations at respective prism output apertures and imaging elements positioned to receive each colored light for converting the received colored light into electrical signals representing the received image, the position of each imaging element to said prism being critical, said method comprising:
securing the prism to and between a set of spaced parallel opaque plates;
positioning and holding a plurality of parallel glass rods adjacent to the prism output apertures and normal to and in contact with each said parallel plates at sides of said rods, said sides being parallel to the length dimension of said rods;
positioning and holding a plurality of said imaging elements adjacent to the sides of said rods in a position to respond to light transmitted from said prism output apertures, each element corresponding to a different output aperture;
applying light responsive curing adhesive to the regions adjacent the interfaces of said rod sides, plates and imaging devices; and
illuminating an end of each said rods to cause light to transversely scatter through the sides of said rods for a time sufficient for the scattered light to cure said adhesive.

10. The method of claim 9 further including the step applying an additional non-light responsive adhesive to said plates, rods and elements for strengthening the joints of said imaging device.

11. The method of claim 9 wherein said illuminating step includes illuminating all said rods with light from the same direction.

* * * * *